United States Patent [19]

Modera et al.

[11] Patent Number: 5,522,930

[45] Date of Patent: Jun. 4, 1996

[54] METHOD AND DEVICE FOR PRODUCING AND DELIVERING AN AEROSOL FOR REMOTE SEALING AND COATING

[75] Inventors: Mark P. Modera, Piedmont, Calif.; Francois R. Carrie, Lyons, France

[73] Assignee: The Regents, University of California, Oakland, Calif.

[21] Appl. No.: 333,980

[22] Filed: Nov. 4, 1994

[51] Int. Cl.$^6$ .................................................... B05D 1/02
[52] U.S. Cl. ................................ 118/317; 118/DIG. 10; 427/236
[58] Field of Search ................................ 427/230, 236, 427/237, 238, 239, 421; 118/DIG. 10, 317

[56] References Cited

U.S. PATENT DOCUMENTS

| 4,331,722 | 5/1982 | Packo et al. | 427/237 |
| 4,994,307 | 2/1991 | Price et al. | 427/237 |

*Primary Examiner*—Shrive Beck
*Assistant Examiner*—David M. Maiorana
*Attorney, Agent, or Firm*—Paul R. Martin

[57] ABSTRACT

The invention is a method and device for sealing leaks remotely by means of injecting a previously prepared aerosol into the enclosure being sealed. Specifically the invention is a method and device for preparing, transporting, and depositing and solid phase aerosol to the interior surface of the enclosure.

5 Claims, 1 Drawing Sheet

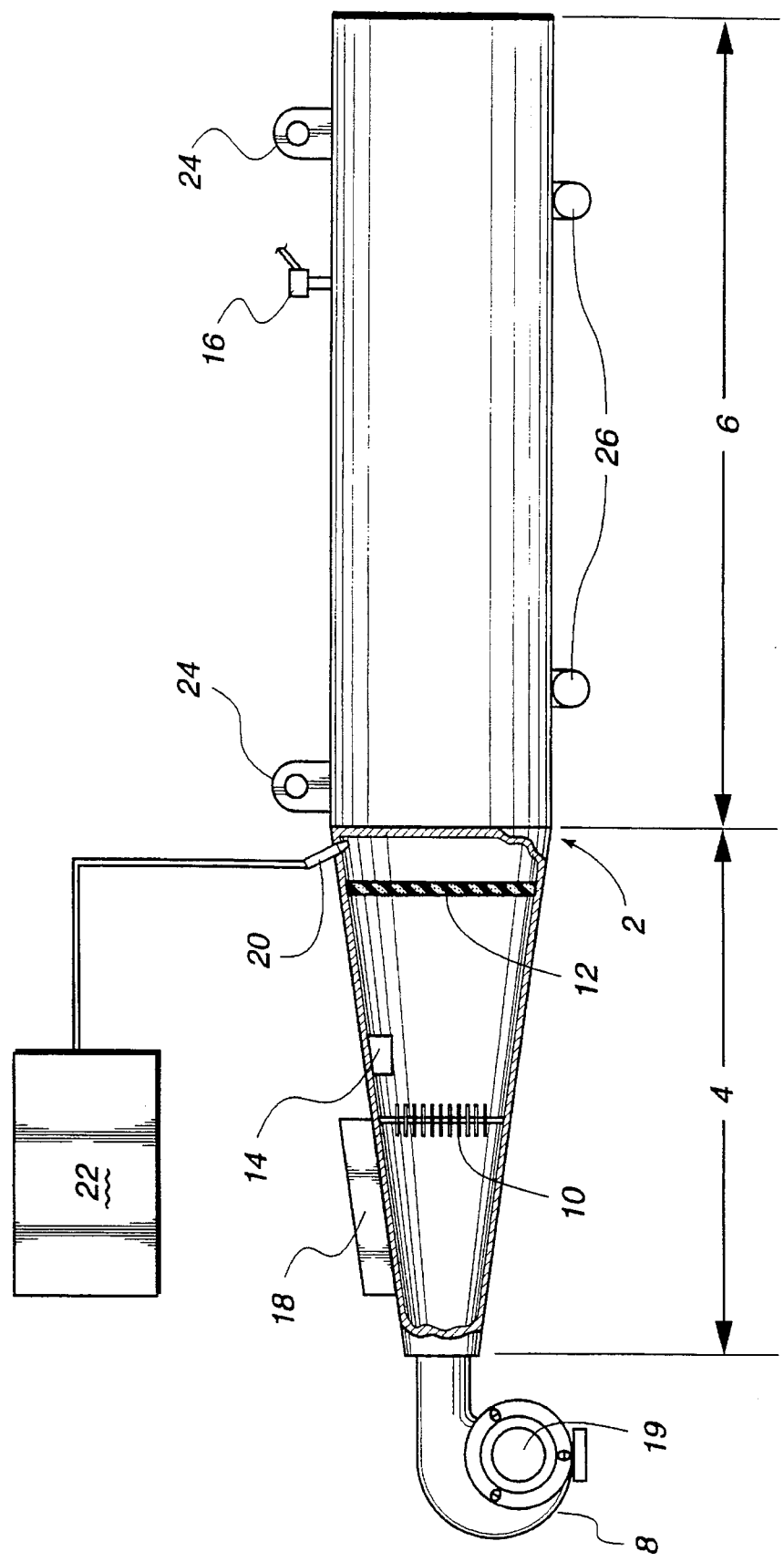

METHOD AND DEVICE FOR PRODUCING AND DELIVERING AN AEROSOL FOR REMOTE SEALING AND COATING

The invention described herein was made with Government support under Contract No. DE-AC03-76SF00098 between the U.S. Department of Energy and the University of California for the operation of Lawrence Berkeley Laboratory. The Government has certain rights in this invention.

FIELD OF THE INVENTION

The present invention relates to a method and device for producing and delivering an aerosol for remote sealing and coating. More specifically the invention relates to sealing leaks from the inside of enclosures or applying an even coating to the inside surface of those enclosures remotely by means of injecting an aerosol into the enclosure to be sealed.

BACKGROUND OF THE INVENTION

There is a substantial need for methods of remote sealing and coating. Research has shown that the energy savings potential of sealing duct leaks is on the order of 20% of the furnace or air conditioner energy use (Modera, M. P. (1994) *Energy and Buildings*, 20:65–75). Conventional sealing technologies including duct tape, mastics. However, such techniques are generally unsatisfactory for remotely sealing ductwork. Encapsulants for duct systems have been previously disclosed and some of those have been applied by introducing a fog into the duct system.

Shinno teaches sealing and coating a pipe through the application of a mist to the interior surface of the pipe [U.S. Pat. No. 4,327,132 Method for Lining of Inner Surface of a Pipe (Apr. 27, 1982)]. This patent discusses the use of a multiple component epoxy based mist which is applied with a rapid air stream and then dried in place with the same rapid air stream. It also discusses the withdrawal and revival of residual paint exhausted from the pipe outlet. The Shinno patent calls for multiple gas flows, one to atomize the liquid to be applied and another to blow the mist down the pipe. Shinno also calls for mixture velocities of between 30 meters/second and 100 meters/second.

Koga teaches a method and apparatus for generating a plastic mist for deposition upon the interior surface of a pipe [U.S. Pat. No. 4,454,173 Method for Lining Pipes in a Pipeline (Jun. 12, 1984) and U.S. Pat. No. 4,454,174 Method for Lining Pipes of a Pipeline (Jun. 12, 1984)]. These patents confine themselves to the delivery of a plastic mist to the interior pipe surface. The Koga patents describe the use of a compressor and a vacuum generator to carry the mist through the pipeline. Additionally, these patents teach the use of low air pressure at one stage and high air pressure at another. In the Koga patent a heater is used to maintain the plastic in a liquid form.

Hyodo et al. teaches a method for sealing pipes which comprises feeding an aerosol type sealant into a pipe in the form of a foam [U.S. Pat. No. 4,768,561 Process for Sealing Pipes (Sep. 6, 1988)]. The sealant disclosed is one containing an aqueous resin selected from the group consisting of emulsions and latexes as a main component and being added with a propellant such as Freon 12/Freon 114.

SUMMARY OF THE INVENTION

The present invention is a method and device for remotely sealing and coating an enclosure from within. It allows for precise control of where the encapsulant material is deposited and is capable of effectively sealing leaks remotely from within an enclosure even where a complex network of bends, tees, and wyes is involved.

Using an aerosol to seal leaks from within an enclosure or to apply an even coating along the interior surface of an enclosure requires careful preparation of the aerosol and control of the flow through the enclosure. In the case of leak sealing, the pressure within the enclosure must also be controlled in order for the aerosol to find the leaks.

The present invention represents a dramatic breakthrough in the technology because it is capable of both remotely sealing and coating an enclosure from within. Not only useful for sealing and coating ducts, this technology is also applicable to filling voids in buildings and other cavities for increased structural integrity, sound proofing, and insulation. The sealing and coating method and device described in this application offer significant advantages over the conventional technology.

It is an object of the present invention to provide a method and device which is capable of sealing a plurality of leaks from within an enclosure.

It is another object of the present invention to provide a method and device which can seal leaks without having to be directed towards specific openings.

It is a further object of the present invention to provide a device which can be easily transported.

It is a further object of the present invention to provide a device which is safe and easy to use.

These and other objects and features of the invention will become fully apparent when the following detailed description of the invention is read in conjunction with the accompanying drawings.

BRIEF DESCRIPTION OF THE DRAWINGS

FIG. 1 is a cutaway side view of a device for implementing the method of the present invention.

DETAILED DESCRIPTION OF THE INVENTION

The present invention is a method and device for the remote sealing and coating of a structure from within. Specifically the invention includes a method for preparing, transporting, and depositing an aerosol remotely along the interior surface of an enclosure. The invention also includes a device capable of performing the method.

The Method

There are four steps to the general method of the present invention. First, an aerosol is prepared from a liquid suspended solid. Second, a carrier flow is generated. Third, the aerosol is introduced into the carrier flow. Fourth, the aerosol laden carrier flow is used to pressurize the enclosure to be sealed.

The most critical aspect of preparing the aerosol for the subject invention is that it must be appropriately sized and substantially solidified prior to reaching the leaks to be sealed. The aerosol must be sized small enough to travel to the leaks prior to leaving the carrier flow through gravitational settling and be large enough to leave the air stream and deposit along the leak boundaries once the leak is reached. When used for sealing the aerosol must be solid before it impinges upon the interior surface of the enclosure.

In one embodiment of the present invention, this preparation is accomplished by either 1) drying the air prior to the injection of a liquid suspended solid aerosol or 2) heating the incoming airflow prior to aerosol injection. When using a liquid base for the sealant aerosol, one means for the controlling the size of the aerosol particles is determined by the type of injection nozzle used and the degree of dilution of the particles. Alternatively, it is possible that a solid phase aerosol could be used directly.

The most important variables affecting the transport and deposition of the aerosol are, the duct flow rate, the size of the particle, and the duct pressure. All three variables affect the rate and efficiency with which sealing and coating occur. They also determine how far down the pipe a particle will travel prior to gravitational settling.

These variables can be calculated once a particular sealing efficiency has been chosen. Sealing efficiency is the product of penetration efficiency (P) and deposition efficiency ($\eta$).

$$[\text{sealing efficiency}] = (P)(\eta)$$

$$P = \exp\left(-\frac{4V_e L}{vRe_D}\right)$$

$$\eta \sim \frac{\tau v_s^2}{y_s} \frac{e}{v_s h} = Stk \frac{e}{h}$$

Stokes number is defined by:

$$Stk = \frac{SRe}{18}\left(\frac{d_p}{h}\right)^2 \sqrt{\frac{\alpha}{2}} = \frac{\tau c v}{y}$$

Calculations were performed using the models for the velocity caused by turbulent diffusion ($V_d$).

$$V_d = V_* U \sqrt{f/2}$$

$$\begin{cases} V_* = 6.9 \times 10^{-4} \tau_*^2 & \text{for } \tau_* \leq 15 \\ V_* = 0.16/\tau_*^{0.086} & \text{for } \tau_* > 15 \end{cases}$$

$$\tau_* = \frac{\tau U}{D} fRe_D$$

and the friction factor f is given by the Blasius equation:

$$f = \frac{0.316}{4Re_D^{0.25}}$$

$V_e$ can be assessed numerically:

$$V_e = \begin{cases} \frac{1}{2\pi}[(\pi + 2\gamma)V_d + 2V_g \cos\gamma] & \text{if } |V_d| < |V_g|, \gamma = a\sin\left(\frac{V_d}{V_g}\right) \\ V_d & \text{if } |V_d| \geq |V_g| \end{cases}$$

| Nomenclature | |
|---|---|
| $C_c$ | Cunningham slip correction factor [–] |
| $C_d$ | drag coefficient [–] |
| $C_m$ | mass concentration of the aerosol [kg/m$^3$] |
| $C_p$ | resistance coefficient of the orifice [–] |
| c | surface corresponding to the slot (black pixels) [m$^2$] |
| D | duct diameter [m] |
| d( ) | differential [–] |
| $d_p$ | particle diameter [m] |
| $\frac{dU}{dy}$ | velocity gradient of the approaching flow [s$^{-1}$] |
| e | duct wall thickness [m] |
| f | friction factor [–] |

| -continued | |
|---|---|
| Nomenclature | |
| g | acceleration of gravity [m/s$^2$] |
| h | leak width [m] |
| L | duct length [m] |
| P | penetration [–] |
| Q | flow rate [m$^3$/s] |
| Re | slot Reynolds number $\frac{v_s h}{v}$ [–] |
| $Re_D$ | duct Reynolds number $\frac{UD}{v}$ [–] |
| $Re_p$ | particle Reynolds number (based on its relative velocity) [–] |
| r | radius of curvature of the streamlines [m] |
| S | particle-to-air density ratio [–] |
| Stk | Stokes number $\frac{\tau v_s}{y_s} = \frac{SRe}{18}\left(\frac{d_p}{h}\right)^2 \sqrt{\frac{\alpha}{2}}$ [–] |
| t | time [s] |
| $t_{res}$ | residence time in the separation zone $t_{res} \sim \frac{y_s}{v_s}$ [s] |
| U | average velocity in the duct [m/s] |
| $U_s$ | velocity upstream of the slot at $y = y_s$ [m/s] |
| $\underline{u}$ | velocity along x [m/s] |
| $\vec{u}$ | velocity vector [m/s] |
| $V_d$ | turbulent diffusion velocity [m/s] |
| $V_e$ | effective mean deposition velocity at the wall [m/s] |
| $V_g$ | gravitational settling velocity [m/s] |
| $V_*$ | dimensionless deposition velocity [–] |
| v | velocity along y [m/s] |
| $v_r$ | radial velocity of the particle [m/s] |
| $v_s$ | bulk velocity through the slot$^6$; here $\sqrt{\frac{1}{C_p}\frac{2\Delta P}{\rho_f}}$ [m/s] |
| w | thickness of the seal [m] |
| $w_r$ | relative velocity of the particle $w_r = \|\vec{u}_p - \vec{u}_f\|$ [m/s] |
| x | horizontal coordinate [m] |
| y | verticle coordinate [m] |
| $y_s$ | height of the dividing suction streamline [m] |
| Greek symbols: | |
| $\alpha$ | dimensionless velocity gradient of the approaching flow $\frac{h}{v_s}\frac{dU}{dy}$ [–] |
| $\beta$ | angle [rd] |
| $\Delta P$ | pressure differential across the slot [Pa] |
| $\gamma$ | angle [rd] |
| $\eta$ | deposition efficiency [–] |
| $\theta$ | dimensionless time $\frac{tv_s}{y_s}$ [–] |
| $v$ | kinematic viscosity of the fluid of interest [m$^2$/s] |
| $\rho$ | density [kg/m$^3$] |
| $\sigma$ | uncertainty associated with the measurement of c [m$^2$] |
| $\tau$ | particle relaxation time [s] |
| $\tau_*$ | dimensionless particle relaxation time [–] |
| $\omega$ | vorticity [s$^{-1}$] |
| Subscripts and superscripts: | |
| f | pertaining to the fluid of interest |
| i | at i minutes for the beginning of the experiment |
| o | at the beginning of the experiment |
| p | pertaining to particle |
| ref | at the reference pressure differential |
| seal | pertaining to particle build up on the edge |
| * | dimensionless quantities |
| – | average value |

There is more than one set of flow rates, particle size, and duct pressures that will satisfy these equations. For the present invention the solid aerosol particle can measure between 1–100 microns. In its preferred range the particle size should measure between 2–40 microns in diameter with a most preferred range of between 3–15 microns in diameter. Flow rates can range from 20–20,000 cubic meters per hour. In residential duct work the preferred range for flow rates is between 100–5000 cubic meters per hour with a most preferred range of between 200–600 cubic meters per hour. In commercial duct work the preferred range for flow rate is between 500–5000 cubic meters per hour. There is an upper limit on duct pressure established by the structural integrity of the enclosure to be sealed.

With regards to sealing leaks, particle deposition is achieved by "building up a bridge" between the boundaries formed by a leak in the enclosure. In one embodiment, the particulate sealant material is suspended in a liquid base. A solid phase aerosol is formed by removing the liquid during the aerosol injection. One example of a suitable material is to suspend vinyl plastics in water for use as an aerosol. Specifically, an aerosol is generated from a liquid suspension of an acetate-acrylate vinyl polymer and then dried in order to obtain solid sticky particles. Regardless of the material chosen, it is critical that the particles retain their shape on impact with the leak boundaries. If the particles are too deformable, they will tend to spread over the leak boundaries preventing any particle build up spanning the leaks.

In the actual practice of the above described method the duct flow rate and the pressure within the enclosure must be maintained to minimize the loss of sealant material. In practice the pressure and flow rate must be maintained above a minimum value.

The preparation of the enclosure to be sealed typically includes closing intentional openings in the enclosure. For example, the vents in a heating system would be closed. Another possible step in the preparation of the enclosure would be the introduction of bag filters to keep up the velocity within the system. In the real world it would also be necessary to isolate any objects within the enclosure that might be sensitive to coating.

In the sealing application, closing intentional openings and using a gas as the carrier makes it possible for the invention to provide immediate feedback on the air-tightness of the enclosure being sealed. This is accomplished by monitoring the carrier flow and the enclosure pressure during the sealing process.

A Device

One aspect of the present invention is a device for carrying out the method described above. FIG. 1 illustrates one embodiment of the present invention. The device is made up of a primary body 2 being comprised of a hollow structure divided into a preparation end 4 and a delivery end 6. In one embodiment the primary body 2 is cylindrical in shape with the preparation end 4 tapering into a truncated cone.

A fan 8 is connected to the preparation end 4 of the primary body 2. The fan 8 produces an airflow through the hollow portion of the primary body 2 and exits at the delivery end 6 of the primary body 2. The air flow produced is the carrier flow into which the solid phase aerosol will be injected and the used to pressurize the enclosure to be sealed. An airheater 10 placed between the fan 8 and the delivery end 6 of the primary body 2 heats the incoming airflow. In another embodiment the use of a desiccant could be substituted for the heater 10. A filter 12 is fitted between the airheater 10 and the delivery end 6 of the primary body 2 to reduce any particulate impurities prior to injecting the aerosol and insure that aerosol particles do not come in contact with the heater 10.

A thermostat 14 is located within the primary body 2. A pressure switch 16 is located within the primary body 2. In the present embodiment the switch 16 is located in the delivery end 6 of the primary body 2. A control mechanism 18 connecting the fan 8, pressure switch 16, airheater 10, and thermostat 14 in conjunction with those parts controls the temperature and velocity of the carrier flow.

A flow measurement sensor 19 is connected to the inlet of the fan 8. In one embodiment, the pressure difference across an orifice plate is measured with a pressure transducer. The flow through the unit is proportional to the square root of the pressure differential across the orifice plate.

An injection nozzle 20 is set into the primary body 2 between the filter 12 and the delivery end 6 of the primary body 2. A liquid suspension of aerosol is delivered to the injection nozzle 20 from an aerosol source 22. In one embodiment the aerosol source 22 is comprised of an air compressor, a pressure regulator, and a liquid storage tank. The best results will be obtained where the injection nozzle and aerosol source produce a monodisperse aerosol. If a dry aerosol source is used than the heater 8 can be eliminated.

A pair of handles 24 are attached to the primary body 2 of the device to aid with transportation and handling of the device. Additionally, a set of feet 26 are attached to the bottom of the primary body 2 to stabilize the unit and aid in positioning the device.

In actual use the delivery end 6 is connected to an opening in the enclosure to be sealed. The fan 8 generates a carrier flow which is pulled through the flow measurement sensor 19, heated by the airheater 10, and then passed through the filter 12 to remove impurities. Aerosol is injected from the aerosol source 22 through the injection nozzle 20 into the preparation end 4 of the device. The aerosol is carried by the carrier flow generated by the fan 8 and out the delivery end 6 of the device. The liquid in the aerosol evaporates off and the remaining solid phase aerosol is used to pressurize the enclosure to be sealed.

The pressure differential between the interior of the enclosure and the outside atmosphere causes the particles of the solid phase aerosol to find the leaks in the enclosure. When the aerosol impinges on the interior boundaries of the leaks, it sticks where it makes contact. Through this process a "bridge" is built up between the boundaries formed by a leak in the enclosure.

As leaks are sealed the pressure in the enclosure rises. The rise in pressure acts as feed back to the device and the pressure switch 16 in conjunction with the control mechanism 18 turns of the device once pressure reaches a level indicating that the leaks are sealed.

It will be recognized by those skilled in the art that this description may not be the only possible description, or the most accurate description of the theory of this device.

EXAMPLE 1

Experiments were conducted using a device similar to the embodiment described herein. It has been found that use of the method and device of the present invention can seal 16 $cm^2$ of Effective Leakage Area (ELA) in an enclosure in less than 30 minutes. The results in Table 1 provides a proof-of-concept of the sealing of an enclosure with aerosols. Table 1 illustrates typical results.

TABLE 1

| | | | | ELA Reduction After Aerosol Injection | | | | |
|---|---|---|---|---|---|---|---|---|
| # | Flow Rate [m³/h] | Starting Pressure [Pa] | Ending Pressure [Pa] | Liquid Flow Rate [cc/min] | Duration [min] | ELA before Injection [cm²] | Precision Errors (in %) | ELA Reduction (in %) |
| 1 | 40 | 16 | 60 | 5.7 | 50 | 16.4 | 3.0 | 34 |
| 2 | 70 | 67 | 96 | 10 | 25 | 16.4 | 3.0 | 18 |
| 3 | 60 | 60 | 135 | 6 | 20 | 16.4 | 3.0 | 84 |
| 4 | 50 | 29 | 210 | 5 | 30 | 16.4 | 3.0 | 95 |
| 5 | 50 | 40 | 205 | 5 | 30 | 16.4 | 3.0 | 82 |
| 6 | 40 | 27 | 210 | 4 | 30 | 16.4 | 3.0 | 94 |
| 7 | 40 | 30 | 209 | 4 | 30 | 16.4 | 3.0 | 94 |
| 8 | 30 | 10 | 18 | 3 | 30 | 16.4 | 3.0 | 29 |
| 9 | 60 | 60 | 105 | 6 | 30 | 16.4 | 3.0 | 94 |
|  | 40 | 7 | 10 | 4 | 30 | 36.1 | 2.4 | 37 |
| 11 | 50 | 10 | 15 | 5 | 30 | 26.3 | 2.7 | 42 |

In the Experiments(#) 1–11 summarized in Table 1, an in-line heater was used to lower the water content of the aerosol particles prior to aerosol injection.

From Table 1, it can be seen that the ELA of the Enclosure can be reduced by more than 90% in 20 to 45 minutes. In addition, the initial air flow rate can be lowered down to 40 cubic meters/hour per branch and still provides sufficient aerosol penetration and significant ELA reduction (see experiments 6 and 7). According to our experiments, plugging an equivalent of 16 cm² will occur in about 30 minutes. Larger initial leaks require more time for sealing (see experiments 10 and 11).

We claim:

1. A device for remotely sealing and coating an enclosure from within comprising:

a) a primary body being comprised of a hollow structure divided into a preparation end and a delivery end, b) a fan connected to the preparation end of the primary body, c) an airheater disposed between said fan and the delivery end of the primary body, d) a filter disposed between said airheater and the delivery end of the primary body, e) a thermostat located within the primary body, f) a pressure switch located within the primary body, g) a control mechanism connecting said fan, the pressure sensor, said airheater and the thermostat, h) an injection nozzle set into the primary body between the filter and the delivery end of the primary body, i) an aerosol source connected to said injection nozzle.

2. The invention as recited in claim 1, wherein a flow measurement apparatus is connected to said fan.

3. The invention as recited in claim 2, wherein the pressure switch is a remote unit located within the enclosure to be sealed.

4. The invention as recited in claim 2, wherein the injection nozzle is an ultrasonic nozzle.

5. The invention as recited in claim 2, wherein the aerosol source comprises an air compressor, a pressure regulator, and a liquid storage tank.

* * * * *